(12) United States Patent
Tanizawa et al.

(10) Patent No.: US 12,509,154 B2
(45) Date of Patent: Dec. 30, 2025

(54) INVERTER MOUNTING STRUCTURE FOR VEHICLE

(71) Applicant: MITSUBISHI JIDOSHA KOGYO KABUSHIKI KAISHA, Tokyo (JP)

(72) Inventors: Shoji Tanizawa, Tokyo (JP); Shinsuke Horibe, Tokyo (JP)

(73) Assignee: MITSUBISHI JIDOSHA KOGYO KABUSHIKI KAISHA, Tokyo (JP)

(*) Notice: Subject to any disclaimer, the term of this patent is extended or adjusted under 35 U.S.C. 154(b) by 330 days.

(21) Appl. No.: 18/282,853

(22) PCT Filed: Oct. 8, 2021

(86) PCT No.: PCT/JP2021/037408
§ 371 (c)(1),
(2) Date: Sep. 19, 2023

(87) PCT Pub. No.: WO2022/208951
PCT Pub. Date: Oct. 6, 2022

(65) Prior Publication Data
US 2024/0174294 A1    May 30, 2024

(30) Foreign Application Priority Data
Mar. 30, 2021 (JP) .................................. 2021-056697

(51) Int. Cl.
*B62D 21/15* (2006.01)
*B60K 1/00* (2006.01)
(Continued)

(52) U.S. Cl.
CPC .............. *B62D 21/152* (2013.01); *B60K 1/00* (2013.01); *B60K 11/02* (2013.01); *B60L 15/007* (2013.01);
(Continued)

(58) Field of Classification Search
CPC .... B62D 21/152; B62D 25/085; B62D 25/14; B60K 1/00; B60K 11/02; B60L 15/007;
(Continued)

(56) References Cited

U.S. PATENT DOCUMENTS 9,254,871 B2 *  2/2016  Hotta ....................... B60R 16/04
9,409,495 B2 *  8/2016  Kobayashi .............. B60R 16/04
(Continued)

FOREIGN PATENT DOCUMENTS

DE        102018113169 A1 *  2/2019  .............. B60T 11/10
EP        4 070 979 A1    10/2022
(Continued)

OTHER PUBLICATIONS

JP-2013035443-A English Translation (Year: 2013).*
(Continued)

*Primary Examiner* — Michael T. Walsh
(74) *Attorney, Agent, or Firm* — Birch, Stewart, Kolasch & Birch, LLP

(57) ABSTRACT

An inverter mounting structure for a vehicle includes left and right front side members defining an engine room in which a drive unit is mounted, a bumper beam connecting front portions of the left and right front side members, a dash panel connecting the left and right front side members, an upper bar disposed above the bumper beam, a brake booster attached to the dash panel in the engine room, and an inverter disposed in the engine room and configured to transmit and receive electric power to and from a motor constituting the drive unit. The inverter includes a front portion connected to the upper bar and a rear portion connected to one of the left and right front side members via a bracket, and is disposed in an oblique posture in which the rear portion is positioned higher than the front portion.

11 Claims, 9 Drawing Sheets

(51) Int. Cl.
  *B60K 11/02* (2006.01)
  *B60L 15/00* (2006.01)
  *B60R 19/24* (2006.01)
  *B62D 25/08* (2006.01)
  *B62D 25/14* (2006.01)
  *B60T 13/00* (2006.01)

(52) U.S. Cl.
  CPC ............ *B60R 19/24* (2013.01); *B62D 25/085* (2013.01); *B62D 25/14* (2013.01); *B60T 13/00* (2013.01)

(58) Field of Classification Search
  CPC ..... B60R 19/24; B60T 13/00; B60Y 2306/01; B60Y 2400/61; B60Y 2410/10
  See application file for complete search history.

(56) References Cited

U.S. PATENT DOCUMENTS

| | | | | |
|---|---|---|---|---|
| 9,902,334 | B2* | 2/2018 | Ando | B60R 11/00 |
| 2011/0073394 | A1* | 3/2011 | Wakatsuki | B60K 11/02 |
| | | | | 180/65.245 |
| 2013/0037335 | A1* | 2/2013 | Sakamoto | H05K 7/14322 |
| | | | | 180/65.8 |
| 2025/0091426 | A1* | 3/2025 | Kurita | B60K 1/00 |

FOREIGN PATENT DOCUMENTS

| | | | |
|---|---|---|---|
| JP | 2009090818 A | * | 4/2009 |
| JP | 2011-68229 A | | 4/2011 |
| JP | 2013-35445 A | | 2/2013 |
| JP | 2013035443 A | * | 2/2013 |
| JP | 2015-39981 A | | 3/2015 |
| JP | 5712956 B2 | | 5/2015 |
| JP | 5821387 B2 | | 11/2015 |
| JP | 2016-2960 A | | 1/2016 |
| JP | 2016002960 A | * | 1/2016 |
| JP | 6269246 B2 | | 1/2018 |

OTHER PUBLICATIONS

JP-2016002960-A English Translation (Year: 2016).*
DE-102018113169-A1 English Translation (Year: 2019).*
JP-2009090818-A English Translation (Year: 2009).*
Extended European Search Report for European Application No. 21935107.9, dated Sep. 16, 2024.
International Search Report (PCT/ISA/210) issued in PCT/JP2021/037408, dated Dec. 21, 2021.
Written Opinion of the International Searching Authority (PCT/ISA/237) issued in PCT/JP2021/037408, dated Dec. 21, 2021.

* cited by examiner

INVERTER MOUNTING STRUCTURE FOR VEHICLE

TECHNICAL FIELD

The present invention relates to an inverter mounting structure for a vehicle.

BACKGROUND ART

For example, an electric vehicle such as an electric automobile, a hybrid automobile, or a fuel cell automobile, is traveling with a motor mounted in an engine room as a power source, and is provided with an inverter for converting DC power supplied from a battery into AC power and supplying the AC power to the motor, in order to drive the motor. An example of a mounting structure of an inverter in an engine room is an electric vehicle described in Patent Literature 1.

A transaxle housing accommodating a motor generator is mounted in the engine room of the electric vehicle, and the electric vehicle travels by transmitting a driving force thereof to vehicle wheels. The inverter is disposed on the transaxle housing, is fixed to the transaxle housing via a pair of front and rear brackets, and is connected to the motor generator via an electric power cable to transmit and receive electric power. When a notch is formed in each bracket and an impact is input to the inverter due to a frontal collision of the vehicle, each bracket is bent at a position of the notch, and the inverter moves backward along a substantially arc-shaped track, thereby preventing the inverter from being damaged and preventing the electric power cable from being broken.

CITATION LIST

Patent Literature

Patent Literature 1: Japanese Patent No. 5712956

SUMMARY OF INVENTION

Technical Problem

A brake booster is provided in the engine room of the vehicle, and the electric vehicle may also be provided with an electric booster for generating a hydraulic pressure by a motor (hereinafter both are collectively referred to as a brake booster). The brake booster is attached to a dash panel that defines the engine room and a vehicle compartment, and protrudes into the engine room. In some cases, such a brake booster is disposed at a position where the inverter overlaps the brake booster in a front view when the vehicle is viewed from the front.

In a case where a frontal collision of the vehicle occurs in this layout, when an impact is input to the inverter in accordance with the deformation of a front side member or the like, the inverter that is displaced rearward collides with the brake booster, and there is a possibility that the dash panel is deformed to narrow a space of the feet in the vehicle compartment. Therefore, a countermeasure for preventing such a situation is required, but the technique of Patent Literature 1, which has a different purpose, cannot solve the problem.

The present invention has been made to solve such a problem, and an object of the present invention is to provide an inverter mounting structure for a vehicle that can beforehand prevent a situation in which an inverter collides with a brake booster in a frontal collision of a vehicle.

Solution to Problem

In order to achieve the above object, an inverter mounting structure for a vehicle according to the present invention includes: left and right front side members defining an engine room in which a drive unit is mounted between the left and right front side members; a bumper beam connecting front portions of the left and right front side members; a dash panel connecting the left and right front side members, behind the engine room; an upper bar disposed above the bumper beam and connected to the front portions of the left and right front side member; a brake booster attached to the dash panel in the engine room; and an inverter disposed in front of a master cylinder of the brake booster in the engine room and configured to transmit and receive electric power to and from a motor constituting the drive unit. The inverter includes a front portion connected to the upper bar and a rear portion connected to one of the left and right front side members via a bracket, and is disposed in an oblique posture in which the rear portion is positioned higher than the front portion.

According to the inverter mounting structure for a vehicle configured as described above, crush generated in the front side member is slight in a relatively slight frontal collision, and the upper bar is hardly displaced rearward, so that the front portion of the inverter is displaced downward, and accordingly, the rear portion of the inverter is displaced upward. As a result, the rear portion of the inverter moves upward away from the master cylinder of the electric booster positioned immediately after the rear portion of the inverter, and the collision between the rear portion of the inverter and the master cylinder is prevented.

It is preferable that the drive unit may be disposed below the inverter, a mount that extends from the front side member and supports the drive unit may be provided at a position in front of the bracket, and the mount may have an overlapping area positioned rearward of the front portion of the inverter and positioned above the front portion of the inverter in an upper-lower direction.

According to this aspect, when the front side member is crushed by the frontal collision and the upper bar is displaced rearward, the inverter is also displaced rearward. At this time, the lower surface of the inverter comes into contact with the mount that forms the overlapping area and comes into sliding contact rearward. As a result, the inverter is displaced rearward, and is pushed up by the mount to be displaced upward, thereby preventing a collision with the master cylinder.

It is preferable that a guide portion extending obliquely upward and rearward may be formed on a front side of the mount. According to this aspect, the lower surface of the inverter is guided in a desired direction by smoothly coming into sliding contact with the guide portion of the mount rearward. It is preferable that a protector may be attached to a lower surface of the inverter so as to correspond to the overlapping area.

According to this aspect, even when the mount strongly collides with the lower surface of the inverter, the protector receives an impact and prevents the inverter from being damaged. It is preferable that a relief portion may be recessed, in a lower surface of the rear portion of the inverter, in an area overlapping the master cylinder in a front view as viewed from the front of a vehicle. According to this aspect, even when an upward positional displacement of the rear portion of the inverter is not sufficiently obtained due to some factor, when the inverter is displaced rearward, the master cylinder enters the relief portion, and is prevented from colliding with the rear portion of the inverter.

It is preferable that the bracket may include a first bracket and a second bracket connected to each other, the second bracket may be connected to the rear portion of the inverter, and the first bracket may extend in the upper-lower direction, be connected to the front side member, and be also connected to the mount. According to this aspect, since the rear portion of the inverter is connected to the mount via the first bracket, the inverter is more reliably supported from the front side member.

It is preferable that the first bracket may be made of a material having a strength lower than that of the second bracket. According to this aspect, when the rear portion of the inverter is displaced upward, a tensile force acts on the first and second brackets, and the first bracket made of a material having low strength is easily deformed and broken. Therefore, the rear portion of the inverter is displaced upward without being hindered by the bracket.

It is preferable that the first bracket may be formed with a fragile portion whose strength is reduced at a connection portion with the mount. According to this aspect, when the rear portion of the inverter is displaced upward, a tensile force acts on the first and second brackets, and the first bracket on which the fragile portion is formed is easily deformed and broken. Therefore, the rear portion of the inverter is displaced upward without being hindered by the bracket.

It is preferable that the first bracket may include a pair of front and rear leg portions, and may be connected to the front side member via the pair of leg portions. According to this aspect, when the rear portion of the inverter is displaced upward, a tensile force acts on the first and second brackets, and the first bracket having the leg portions is easily deformed and broken. Therefore, the rear portion of the inverter is displaced upward without being hindered by the bracket.

It is preferable that the inverter may be disposed in the oblique posture in which the brake booster side is at a higher position than the front side member side in a front view as viewed from the front of the vehicle. According to this aspect, when the inverter is in the oblique posture as compared with a case of a horizontal posture, the brake booster side of the inverter is positioned further upward, and the collision with the master cylinder can be further prevented.

It is preferable that a condensing tank configured to store cooling water for cooling the inside of the inverter may be fixed to the rear portion of the inverter, a pin directed downward may be provided in a protruding manner in the condensing tank, a pin hole may be formed on one side of the bracket, and the pin of the condensing tank may be inserted into the pin hole from above. According to this aspect, the condensing tank is supported from below by the bracket, and the condensing tank is positioned. Further, at the time of a frontal collision, since the condensing tank is sandwiched and crushed between the rear portion of the inverter that is displaced rearward and a vehicle body, for example, cowl top or the like, the impact on the inverter is reduced.

Advantageous Effects of Invention

According to the inverter mounting structure for a vehicle according to the present invention, it is possible to beforehand prevent the situation in which the inverter collides with the brake booster in a frontal collision of the vehicle.

DESCRIPTION OF EMBODIMENTS

Figure 1:
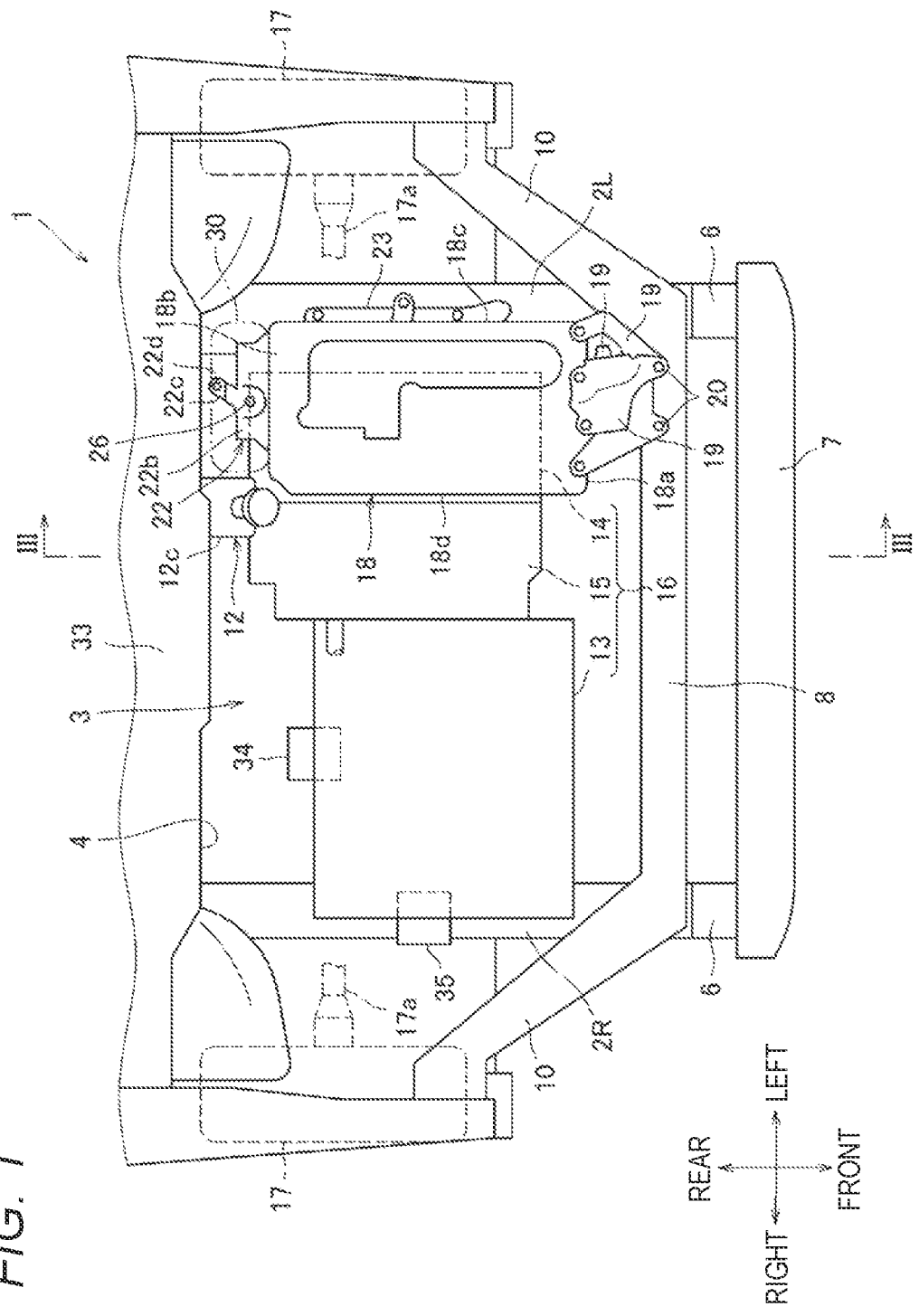
FIG. 1 is a plan view showing an engine room of a hybrid automobile according to an embodiment.

Hereinafter, an embodiment in which the present invention is embodied in an inverter mounting structure for a hybrid automobile will be described. In the following description, front, rear, left, right, and upper and lower directions are defined with reference to a vehicle. As shown in FIGS. 1 to 4, a pair of left and right front side members 2R, 2L extend in a front-rear direction at a front portion of a hybrid automobile 1 (hereinafter, simply referred to as a vehicle), and an engine room 3 is defined therebetween. A dash panel 4 is disposed behind the engine room 3 so as to connect the left and right front side members 2R, 2L, and the engine room 3 and an interior of a vehicle compartment 5 are partitioned from each other. At a front side of the engine room 3, front ends of the left and right front side members 2R, 2L are connected to each other by a bumper beam 7 via a crash box 6.

An upper bar 8 is disposed at a position above and slightly behind the bumper beam 7, and connection bars 9 extend downward from both left and right ends of the upper bar 8, and are connected to front portions of the left and right front side members 2R, 2L, respectively. Further, upper sides 10 are extended from both left and right ends of the upper bar 8 toward an outer side of a rear diagonal vehicle body, and these upper side 10 are connected to the dash panel 4 positioned at the rear.

An electric booster 12 (corresponding to a brake booster of the present invention) implementing a brake system is attached to a left side position of the dash panel 4 in the engine room 3. The electric booster 12 is a device that generates a hydraulic pressure by a motor (not shown) in response to a brake operation of a driver, and a master cylinder 12b is fixed to a main body portion 12a with a built-in motor, and a reservoir tank 12c is fixed on the master cylinder 12b.

In the engine room 3, a drive unit 16 including an engine 13 as an internal combustion engine, a transaxle 14 with built-in motor and generator (not shown), and a speed reducer 15 is mounted. Although not shown, a battery for traveling is mounted under a floor of the vehicle 1. The drive unit 16 is supported from a vehicle body via three mounts 23, 34, and 35, and although details will be described later, the mount 23 among these is disposed on the left front side member 2L.

A function of the drive unit 16 is not directly related to the gist of the present invention, and thus is not described in detail, but a driving force of the engine 13 or a driving force of the motor of the transaxle 14 which is subjected to a power running control by electric power supply from the battery is transmitted to front wheels 17 via axles 17a, and the vehicle 1 travels with rotation of the front wheels 17. Further, at the time of deceleration of the vehicle 1, driving forces from the front wheels 17 are transmitted to the generator of the transaxle 14, and the battery is charged with electric power generated by a regenerative control.

An inverter 18 that transmits and receives electric power to and from the motor and the generator is mounted in the engine room 3. The inverter 18 performs conversion of DC power from the battery to AC power, conversion of AC power from the generator into DC power, and the like. As a result of considering the arrangement of other devices in the engine room 3, the inverter 18 is disposed on the left side in the engine room 3, in other words, in front of the electric booster 12.

As shown in FIGS. 3 to 6, the inverter 18 as a whole has a rectangular parallelepiped shape elongated in the front-rear direction, a front portion 18a of the inverter 18 is connected to the upper bar 8 via a bracket, a rear portion 18b thereof is connected to the left front side member 2L via a bracket, and the inverter 18 is accordingly supported at a predetermined position in the engine room 3. The bracket of the front portion 18a includes three brackets 19 which are connected to each other by bending a metal plate, and is fastened to the upper bar 8 by two bolts 20.

The bracket of the rear portion 18b includes first and second brackets 21, 22 which are connected to each other by bending a metal plate. The first bracket 21 is disposed at a rear position of the mount 23 on the front side member 2L supporting the drive unit 16. The first bracket 21 is formed by welding a mount-side connection member 21b in a horizontal posture to an upper surface of a member-side connection member 21a that has a U-shape opening downward and extends in an upper-lower direction.

A pair of front and rear leg portions 21a1 of the member-side connection member 21a are fastened onto the front side member 2L by bolts 24, respectively. The mount-side connection member 21b extends forward from an upper surface of the member-side connection member 21a, overlaps the mount 23, and is fastened to the mount 23 by a bolt 25. A rear portion 22b of the second bracket 22 is overlapped on an upper surface of the mount-side connection member 21b and fastened by a bolt 26, and the second bracket 22 is bent forward and upward in a stepped shape from the rear portion 22b. Therefore, a front portion 22a of the second bracket 22 is disposed at a higher position than the rear portion 22b, and is overlapped on a lower surface of the rear portion 18b of the inverter 18 and fastened by bolts 32.

Figure 3:
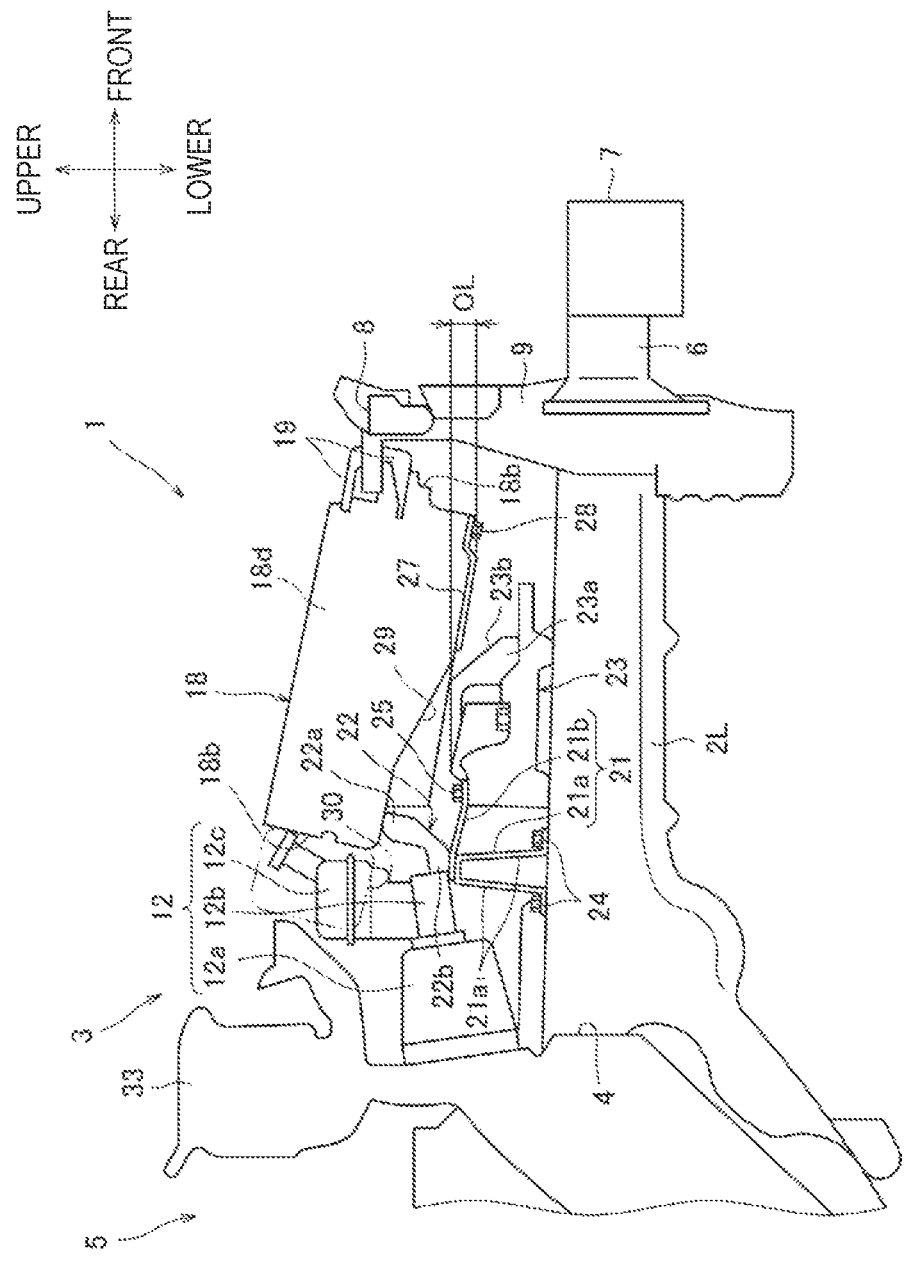
FIG. 3 is a sectional view taken along a line III-III in FIG. 1, showing a positional relationship among the inverter, the electric booster, and a mount.

As a result, in a side view shown in FIG. 3, the rear portion 18b of the inverter 18 is supported from the front side member 2L via the first and second brackets 21, 22, and is separated upward from the front side member 2L by interposition of the brackets 21, 22. Therefore, the inverter 18 is disposed in an oblique posture in which the rear portion 18b is positioned higher than the front portion 18a positioned substantially at the same height as the upper bar 8.

The reason why the first bracket 21 is connected not only to the front side member 2L but also to the mount 23 is to reliably support the rear portion 18b of the inverter 18. That is, since a position of the first bracket 21 is restricted in the front-rear direction by the connection with the mount 23, and the rear portion 18b of the inverter 18 is also restricted from moving in the front-rear direction, the support with respect to the rear portion 18b becomes more reliable.

On the other hand, in order to allow an upward displacement of the rear portion 18b of the inverter 18 at the time of a frontal collision of the vehicle 1 to be described later, a strength of the first bracket 21 is intentionally set to be lower than a strength of the second bracket 22, so that the first bracket 21 is easily deformed and broken. Specifically, as the metal plate of the material of the first bracket 21 (corresponding to a material of the invention), a metal plate whose strength is lower than the second bracket 22 due to a reduction in plate thickness, a change in material, or the like is used. Further, the pair of front and rear long leg portions 21a1 of the member-side connection member 21a of the first bracket 21 are easily deformed and broken. Further, the mount-side connection member 21b (corresponding to a connection portion with the mount of the present invention) is provided with a lightening hole 21b1 (corresponding to a fragile portion of the present invention) penetrating therethrough, and the strength thereof is reduced. Due to these factors, the first bracket 21 is easily deformed and broken when an impact is input.

Figure 2:
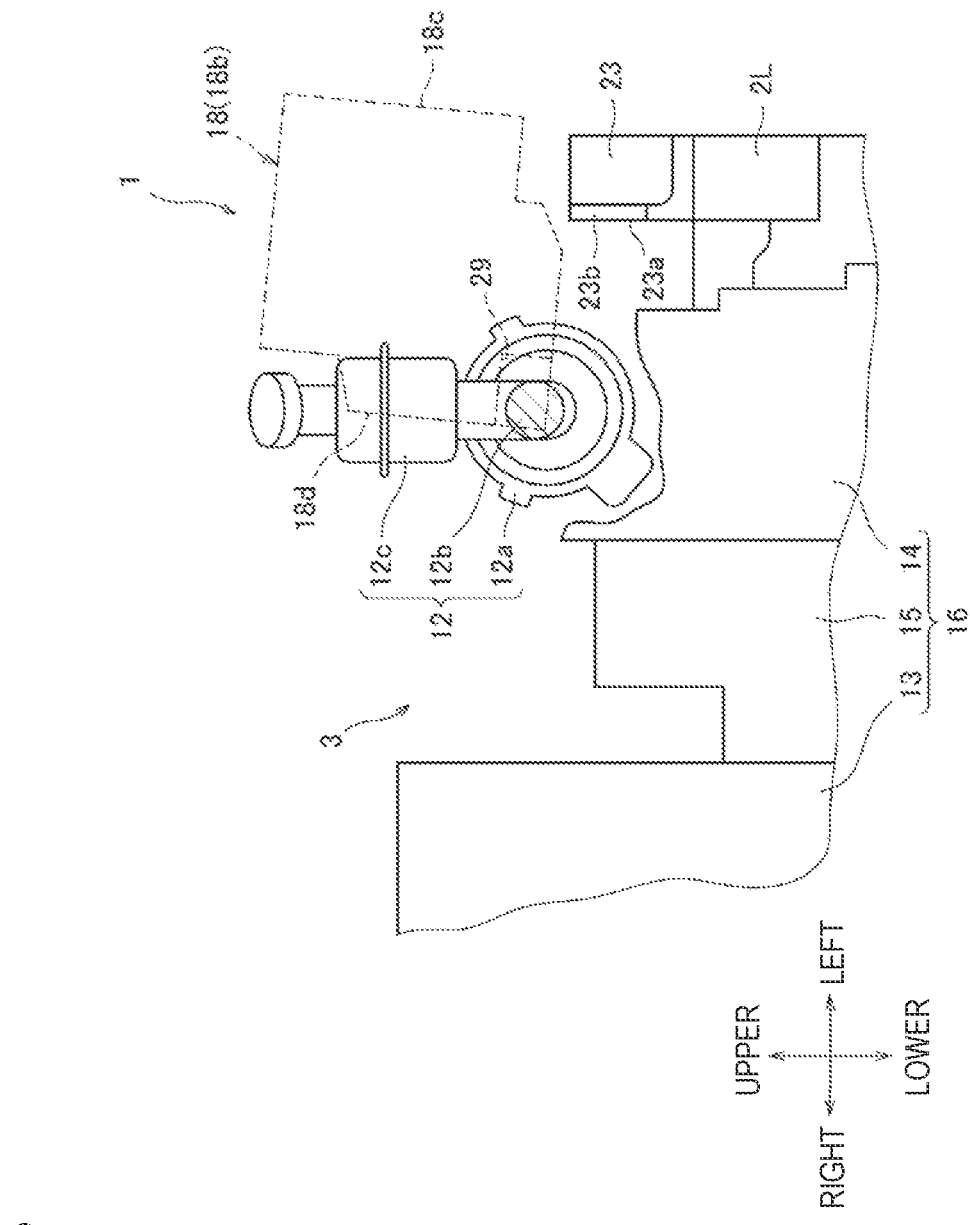
FIG. 2 is a front view showing an overlapping state of a master cylinder of an electric booster and a rear portion of an inverter.
Figure 6:
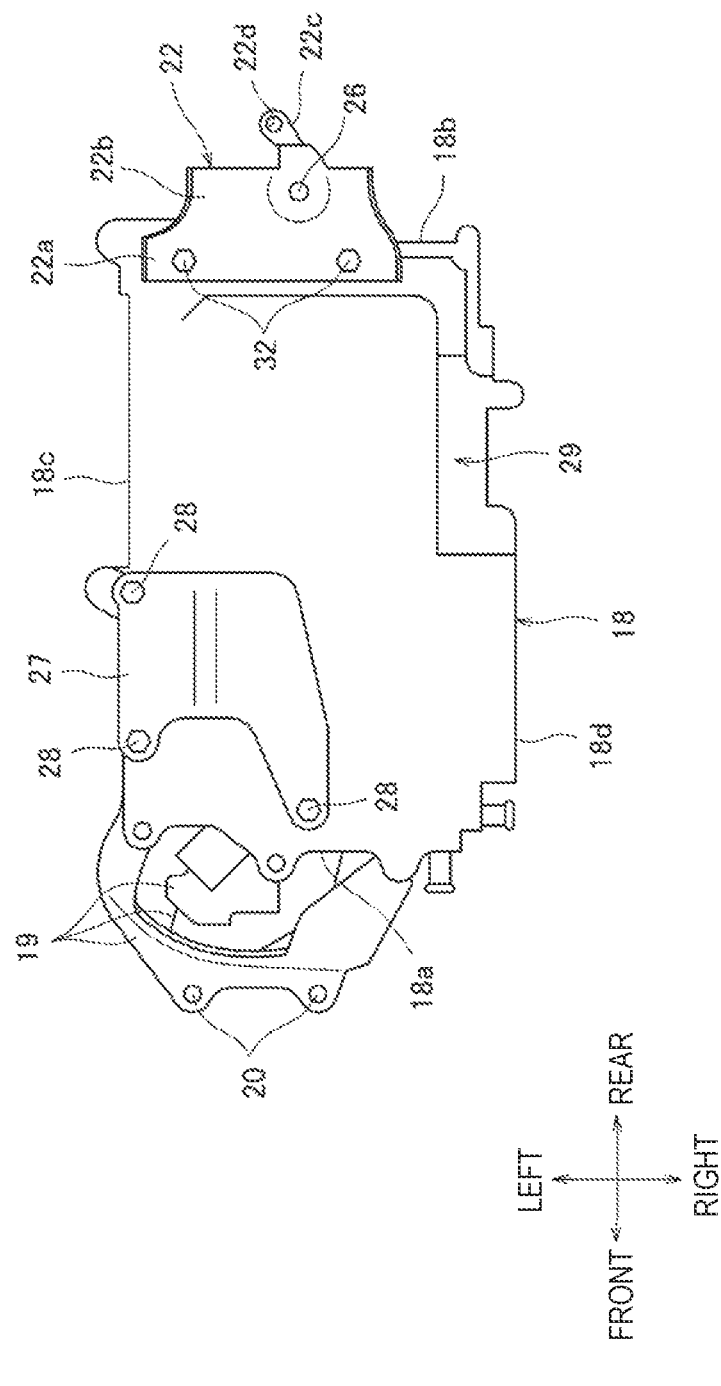
FIG. 6 is a bottom view showing a protector and a relief portion on a lower surface of the inverter.

In a front view shown in FIG. 2, a left portion 18c of the inverter 18 is positioned directly above the front side member 2L and the mount 23, and the rear portion 18b of the left portion 18c is supported by the first and second brackets 21, 22 as described above. Then, as shown in the side view of FIG. 3, a front half area of the inverter 18 overlaps with the mount 23 in the upper-lower direction to form an overlapping area OL in accordance with the oblique posture of the inverter 18 in which the front portion 18a is at a low position. As shown in FIG. 6, a protector 27 made of a metal plate is attached to the left portion 18c of a lower surface of the inverter 18 by bolts 28 so as to correspond to the front half area where the overlapping area OL is formed.

Figure 4:
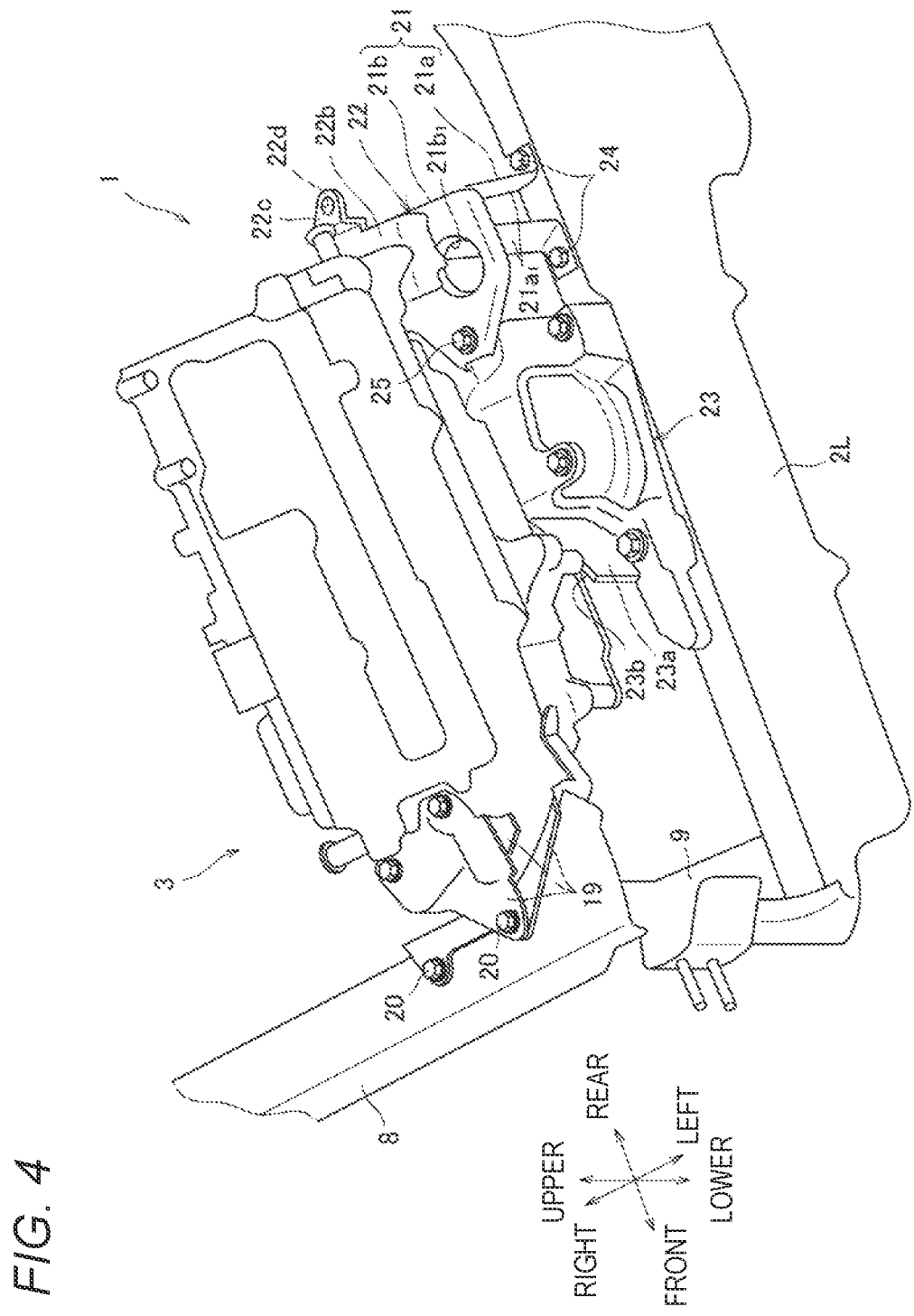
FIG. 4 is a perspective view showing a fixed state of the inverter with respect to a vehicle body as viewed obliquely from the front left.
Figure 5:
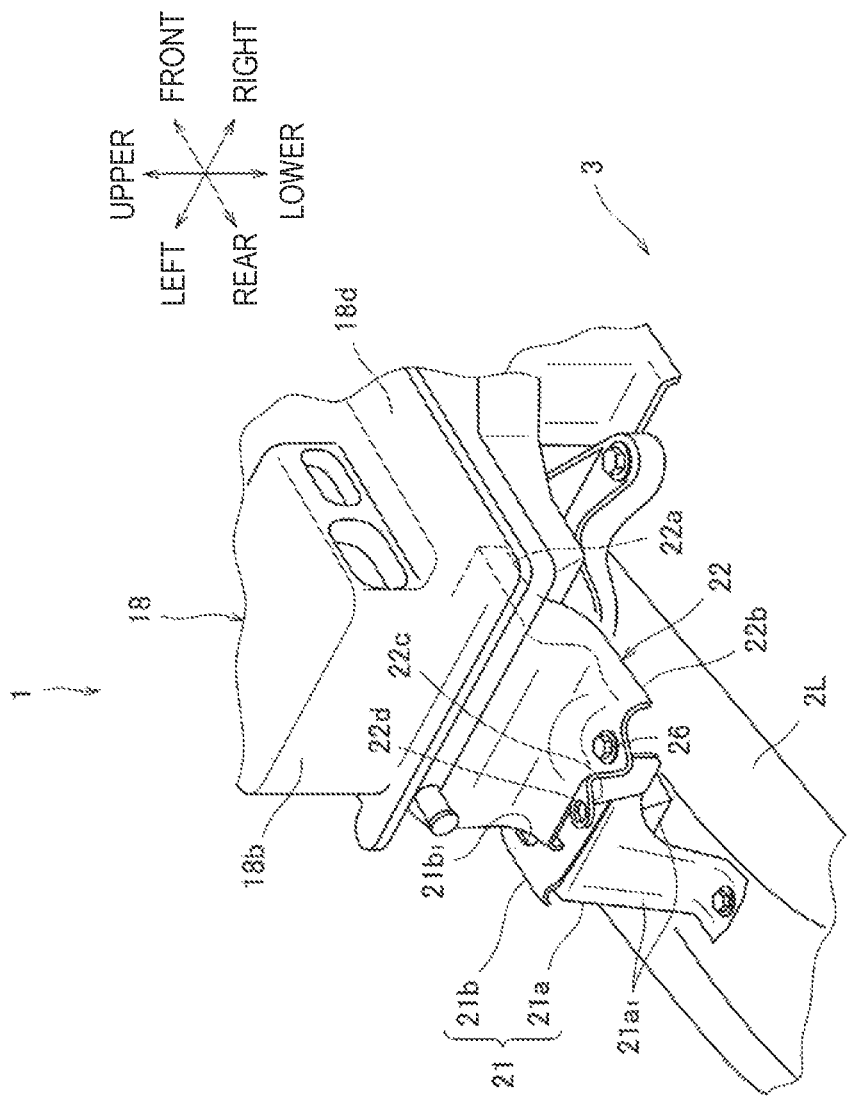
FIG. 5 is a perspective view showing a fixed state of the rear portion of the inverter with respect to the vehicle body as viewed obliquely from the rear right.

As shown in FIGS. 3 and 4, a rib 23a is integrally formed on a front side of the mount 23, and a front edge of the rib 23a forms a guide portion 23b linearly extending obliquely upward and rearward. As a result, the guide portion 23b coincides with the protector 27 of the inverter 18 in a left-right direction, forms the overlapping area OL, and is positioned behind the protector 27. In the front view shown in FIG. 2, the contour of the rear portion 18b of the inverter 18 is indicated by a broken line, and as shown in FIGS. 1 and 2, a right portion 18d of the inverter 18 is positioned immediately before the electric booster 12, and a lower portion of the right portion 18d overlaps the master cylinder 12b in a front view as indicated by hatching in FIG. 2. Further, the inverter 18 is disposed in the oblique posture in which the right portion 18d (corresponding to a brake booster side of the present invention) is positioned higher than the left portion 18c (corresponding to a front side member side of the present invention). The right portion 18d of the inverter 18 is positioned higher than in a case of a horizontal posture, and as a result, an area of the rear portion 18b of the inverter 18 overlapping the master cylinder 12b is reduced.

As shown in FIGS. 2, 3, and 6, a relief portion 29 is recessed in the right portion 18d of the lower surface of the inverter 18, in other words, in the area overlapping the master cylinder 12b in a front view. The relief portion 29 is formed over approximately half the rear side of the right portion 18d of the lower surface of the inverter 18, and forms a slope shape that becomes gradually deeper toward the rear portion 18b, and forms a shape that opens to the rear portion 18b and the right side.

Figure 7:
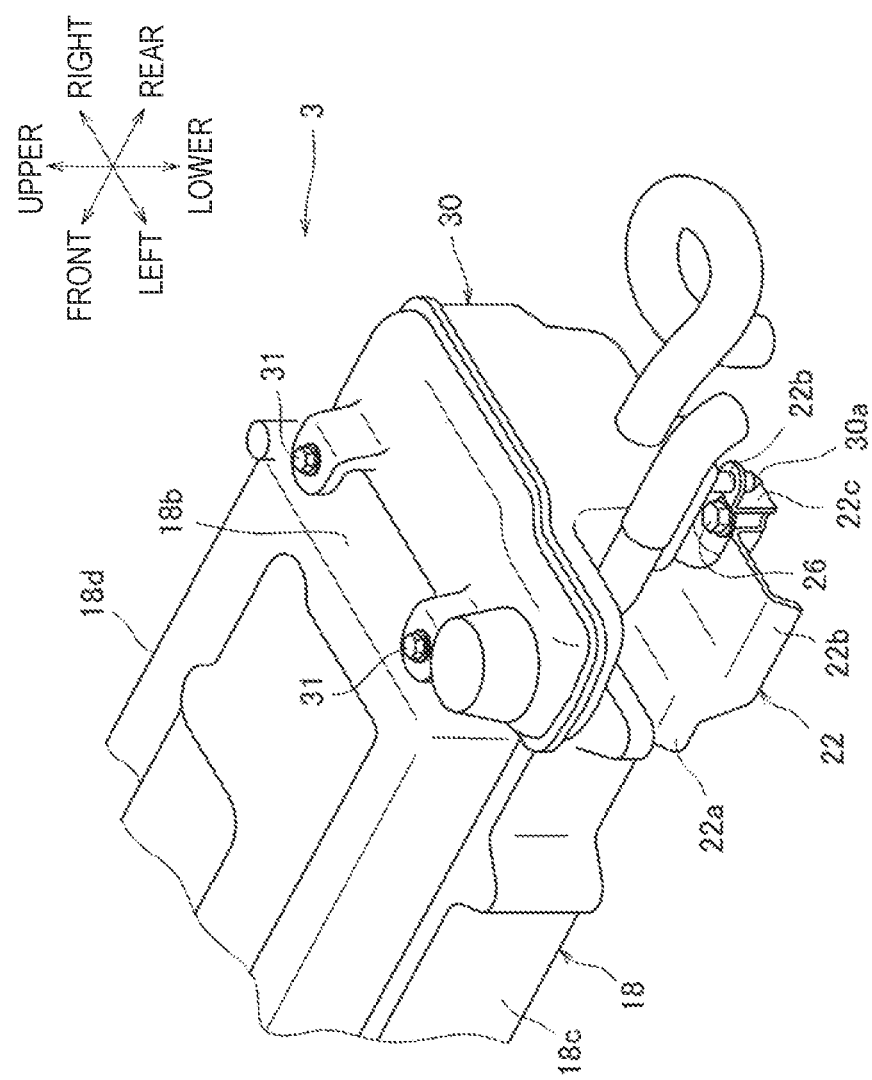
FIG. 7 is a perspective view showing the inverter and a condensing tank as viewed obliquely from the rear left.

On the other hand, as shown in FIGS. 3, 6, and 7, a condensing tank 30 made of synthetic resin is disposed at and is fixed to the rear portion 18b of the inverter 18 by two bolts 31, and a pin 30a directed downward is provided in a protruding manner from a lower surface of the condensing tank 30. A pin hole 22d is formed on one side of the second bracket 22. That is, a stay 22c extends rearward from the rear portion 22b of the second bracket 22, and the pin hole 22d penetrates through a distal end portion of the stay 22c. The pin 30a of the condensing tank 30 is inserted into the pin hole 22d of the stay 22c from above, the condensing tank 30 is supported from below by the stay 22c, and a position of the condensing tank 30 is positioned. During an operation of the inverter 18, cooling water stored in the condensing tank 30 flows through the inside of the inverter 18 to exert a cooling effect. Due to the posture of the inverter 18 in which the rear portion 18b is positioned higher than the front portion 18a, air contained in the cooling water is guided to the condensing tank 30, and air accumulation in the inverter 18 is prevented.

Next, an operation at the time of a frontal collision of the vehicle 1 by the inverter mounting structure configured as described above will be described. First, as shown in FIGS. 2 and 3, the inverter 18 before a collision is disposed in the posture oblique in the front-rear direction with the rear portion 18b positioned higher than the front portion 18a, and is disposed in the posture oblique in the left-right direction with the right portion 18d positioned higher than the left portion 18c. Therefore, in a front view, the rear portion 18b of the inverter 18 merely overlaps the master cylinder 12b of the electric booster 12 with a small area, and is in a positional relationship in which the overlap with the master cylinder 12b is eliminated only by being displaced slightly upward. In addition, the relief portion 29 formed in the inverter 18 is opened rearward, and its open position corresponds to the master cylinder 12b in a front view.

Figure 8:
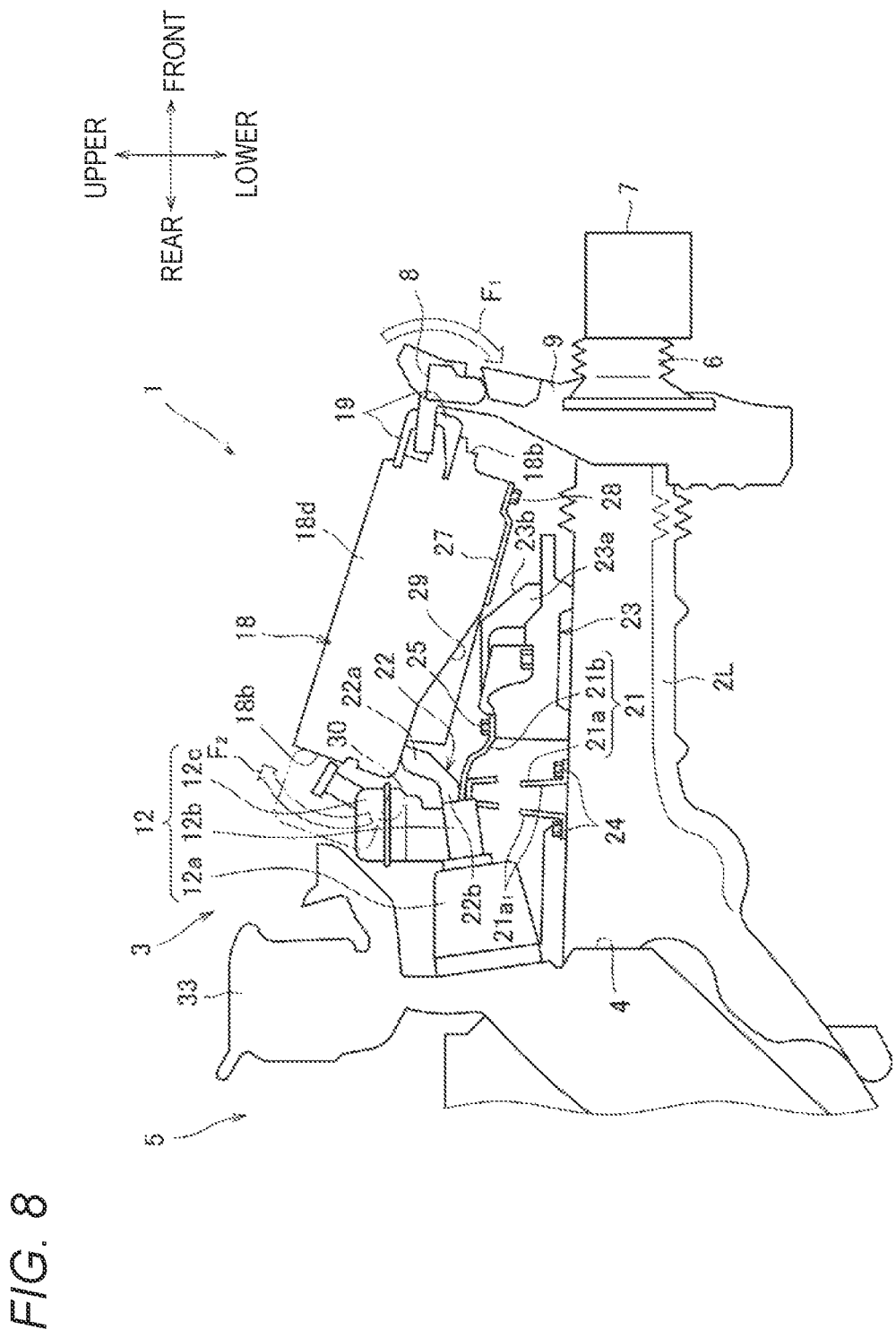
FIG. 8 is a view showing a deformed state of the vehicle at the time of a relatively slight frontal collision.

In such an arrangement state of the inverter 18, in a case where a relatively slight frontal collision occurs, as shown in FIG. 8, the crash box 6 and the front side members 2R. 2L are slightly crushed via the bumper beam 7 because the impact is small. At this time, since the upper bar 8 is hardly displaced rearward, the front portion 18a of the inverter 18 receives a rotational force in a direction of an arrow F1 and is displaced downward, and accordingly, the rear portion 18b of the inverter 18 receives a rotational force in a direction of an arrow F2 and is displaced upward.

When the rear portion 18b of the inverter 18 is displaced upward, a tensile force acts on the first and second brackets 21, 22. Since the strength of the first bracket 21 is intentionally reduced by the use of a material having a low strength, the shape including the leg portion 21a1 that is easily deformed and broken, and the formation of the lightening hole 21b1, the first bracket 21 is easily deformed and broken by receiving the tensile force. Therefore, the rear portion 18b of the inverter 18 is displaced upward without being hindered by the brackets 21, 22, and the rear portion 18b moves upward away from the master cylinder 12b of the electric booster 12 positioned immediately thereafter, thereby eliminating the overlap with the master cylinder 12b.

In this way, since the inverter 18 is hardly displaced rearward in a slight frontal collision, the possibility that the inverter 18 originally collides with the master cylinder 12b is low, and the rear portion 18b of the inverter 18 moves upward away from the master cylinder 12b, so that it is possible to more reliably prevent the collision. Therefore, it is possible to beforehand prevent a situation in which the dash panel 4 is deformed and a space of the feet in the vehicle compartment is narrowed due to a collision with the master cylinder 12b.

Figure 9:
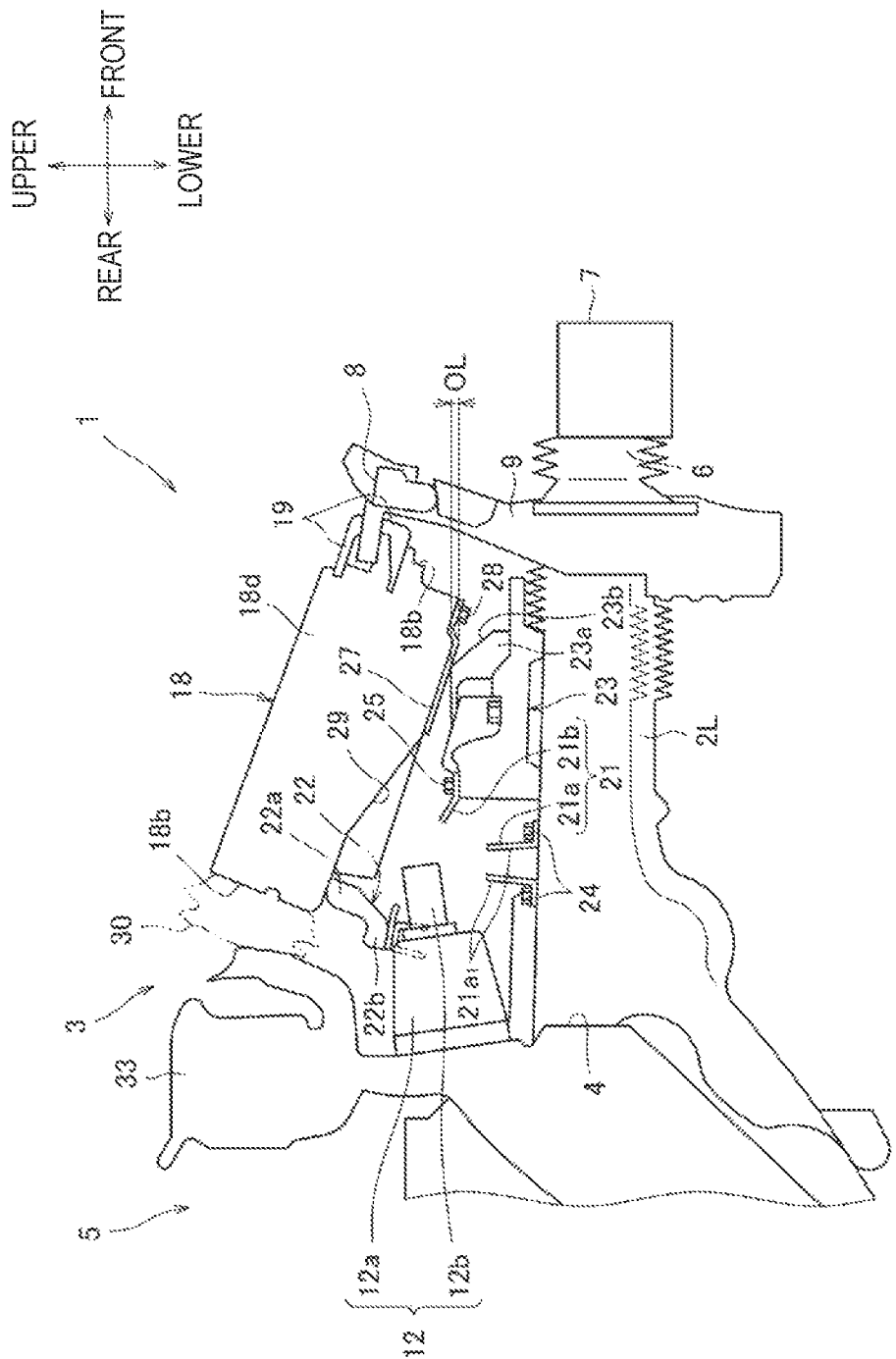
FIG. 9 is a view showing a deformed state of the vehicle at the time of a relatively severe frontal collision.

In a case where a relatively severe frontal collision occurs, as shown in FIG. 9, since the impact is larger than that described above, the front side members 2R. 2L are crushed more largely, the upper bar 8 is displaced rearward, and accordingly, the inverter 18 is also displaced rearward. At this time, the protector 27 on the lower surface of the inverter 18 comes into contact with the guide portion 23b of the mount 23 forming the overlapping area OL in the upper-lower direction, and comes into sliding contact with the guide portion 23b rearward. Therefore, the inverter 18 is displaced rearward, and is pushed up by the guide portion 23b to be displaced upward.

The guide portion 23b of the mount 23 serves to guide the inverter 18 in a desired direction (rearward and upward) by smoothly coming into sliding contact with the protector 27, and the protector 27 made of a metal plate also contributes to smooth sliding contact with the guide portion 23b. In addition, the protector 27 also functions to protect the inverter 18, and even when the mount 23 strongly collides with the lower surface of the inverter 18, the protector 27 receives the impact and beforehand prevents the inverter 18 from being damaged.

When the rear portion 18b of the inverter 18 is displaced upward, a tensile force acts on the first and second brackets 21, 22. As described above, the first bracket 21 having a low strength is easily deformed and broken by receiving a tensile force. Therefore, the rear portion 18b of the inverter 18 is displaced upward without being hindered by the brackets 21, 22, and the overlap with the master cylinder 12b in a front view is eliminated. The rear portion 18b of the inverter 18 reaches the master cylinder 12b by the rearward displacement, but since the rear portion 18b in the upper-lower direction is positioned above the master cylinder 12b, the rear portion 18b of the inverter 18 is prevented from colliding with the master cylinder 12b.

Therefore, even when a severe frontal collision occurs as described above, it is possible to beforehand prevent a situation in which the rear portion 18b of the inverter 18 collides with the master cylinder 12b, that is, a situation in which the dash panel 4 is deformed and a space of the feet in the vehicle compartment is narrowed. Although there is a possibility that the rear portion 18b of the inverter 18 displaced rearward collides with the reservoir tank 12c on the master cylinder 12b, the strength of the master cylinder 12b made of synthetic resin is low. Therefore, as shown in FIG. 9, either of cases where the master cylinder 12b is detached from the master cylinder 12b, or the master cylinder 12b is crushed (not shown) does not cause the deformation of the dash panel 4 or the damage of the inverter 18.

Due to some factors such as a collision situation of the vehicle 1, there is a possibility that an upward positional displacement of the rear portion 18b of the inverter 18 using the mount 23 cannot be obtained sufficiently. In this case, the rear portion 18b of the inverter 18 and the master cylinder 12b are partially overlapped with each other in a front view shown in FIG. 2. However, since the relief portion 29 is formed on the lower surface of the inverter 18, when the inverter 18 is displaced rearward, the master cylinder 12b enters the relief portion 29 and is prevented from colliding with the rear portion 18b of the inverter 18. Therefore, even in such a situation, deformation of the dash panel 4 can be prevented.

On the other hand, as described above, at the time of a relatively severe frontal collision, although the rear portion 18b of the inverter 18 is displaced upward to prevent the collision with the master cylinder 12b, the inverter 18 at this time is also displaced rearward. Therefore, for example, there is a possibility that the rear portion 18b of the inverter 18 collides with cowl top or the like disposed on an upper side of the dash panel 4 to be damaged. In the present embodiment, since the condensing tank 30 made of synthetic resin is fixed to the rear portion 18b of the inverter 18, the condensing tank 30 is sandwiched and crushed between the rear portion 18b of the inverter 18 that is displaced rearward and the cowl top. At this time, the condensing tank functions as a buffer material, and it is also possible to obtain an effect that the impact to the inverter 18 can be reduced and the damage can be prevented.

Although the embodiment has been described above, an aspect of the present invention is not limited to this embodiment. For example, in the above embodiment, the inverter mounting structure for a hybrid automobile has been described, but the present invention is not limited thereto as long as it is the vehicle 1 in which the inverter 18 is mounted in the engine room 3 together with the motor, and the present invention may be applied to, for example, an electric automobile or a fuel cell automobile.

The present application is based on a Japanese Patent Application No. 2021-056697 filed on Mar. 30, 2021, and the content thereof is incorporated herein as reference.

REFERENCE SIGNS LIST 1 hybrid automobile (vehicle)
2R, 2L front side member
3 engine room
4 dash panel
7 bumper beam
8 upper bar
12 electric booster (brake booster)
12b master cylinder
16 drive unit
18 inverter
18a front portion
18b rear portion
21 first bracket (bracket)
21a1 leg portion
21b1 lightening hole (fragile portion)
22 second bracket (bracket)
22d pin hole
23 mount
23b guide portion
27 protector
29 relief portion
30 condensing tank
30a pin

The invention claimed is:

1. An inverter mounting structure for a vehicle comprising:
a left front side member and a right front side member defining an engine room in which a drive unit is mounted between the left front side member and the right front side member;
a bumper beam connecting a left front portion of the left front side member and a right front portion of the right front side member;
a dash panel connecting the left front side member and the right front side member, behind the engine room;
an upper bar disposed above the bumper beam and connected to the left front portion of the left front side member and the right front portion of right front side member;
a brake booster attached to the dash panel in the engine room; and
an inverter disposed in front of a master cylinder of the brake booster in the engine room and configured to transmit and receive electric power to and from a motor constituting the drive unit,
wherein the inverter includes a front portion connected to the upper bar and a rear portion connected to one of the left front side member and right front side member via a bracket, and is disposed in an oblique posture in which the rear portion is positioned higher than the front portion.

2. The inverter mounting structure for a vehicle according to claim 1,
wherein the drive unit is disposed below the inverter,
a mount that extends from the one of the left front side member and right front side member and supports the drive unit is provided at a position in front of the bracket, and
wherein the mount has an overlapping area positioned rearward of the front portion of the inverter and positioned above the front portion of the inverter in an upper-lower direction.

3. The inverter mounting structure for a vehicle according to claim 2,
wherein a guide portion extending obliquely upward and rearward is formed on a front side of the mount.

4. The inverter mounting structure for a vehicle according to claim 2,
wherein a protector is attached to a lower surface of the inverter so as to correspond to the overlapping area.

5. The inverter mounting structure for a vehicle according to claim 2,
wherein a relief portion is recessed, in a lower surface of the rear portion of the inverter, in an area overlapping the master cylinder in a front view as viewed from the front of a vehicle.

6. The inverter mounting structure for a vehicle according to claim 2,
wherein the bracket includes a first bracket and a second bracket connected to each other,
wherein the second bracket is connected to the rear portion of the inverter, and
wherein the first bracket extends in the upper-lower direction, is connected to the front side member, and is also connected to the mount.

7. The inverter mounting structure for a vehicle according to claim 6,
wherein the first bracket is made of a material having a strength lower than that of the second bracket.

8. The inverter mounting structure for a vehicle according to claim 6,
wherein the first bracket is formed with a fragile portion whose strength is reduced at a connection portion with the mount.

9. The inverter mounting structure for a vehicle according to claim 6,
wherein the first bracket includes a front leg portion and a rear leg portion, and is connected to the front side member via the front leg portion and the rear leg portion.

10. The inverter mounting structure for a vehicle according to claim 1,
wherein the inverter is disposed in the oblique posture in which the brake booster side is at a higher position than the front side member side in a front view as viewed from the front of the vehicle.

11. The inverter mounting structure for a vehicle according to claim 1,
wherein a condensing tank configured to store cooling water for cooling the inside of the inverter is fixed to the rear portion of the inverter,
wherein a pin directed downward is provided in a protruding manner in the condensing tank, and
wherein a pin hole is formed on one side of the bracket, and the pin of the condensing tank is inserted into the pin hole from above.

* * * * *